US008311217B2

(12) United States Patent
Yu

(10) Patent No.: US 8,311,217 B2
(45) Date of Patent: Nov. 13, 2012

(54) DATA TRANSMISSION METHOD AND TERMINAL

(75) Inventor: Yang Yu, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 649 days.

(21) Appl. No.: 12/524,899

(22) PCT Filed: Dec. 21, 2007

(86) PCT No.: PCT/CN2007/071307
§ 371 (c)(1),
(2), (4) Date: Jul. 29, 2009

(87) PCT Pub. No.: WO2008/122182
PCT Pub. Date: Oct. 16, 2008

(65) Prior Publication Data
US 2009/0323939 A1    Dec. 31, 2009

(30) Foreign Application Priority Data

Apr. 6, 2007   (CN) .......................... 2007 1 0090422

(51) Int. Cl.
*H04L 9/00* (2006.01)
(52) U.S. Cl. .......................................... 380/42; 380/255
(58) Field of Classification Search .................... 380/42
See application file for complete search history.

(56) References Cited

U.S. PATENT DOCUMENTS

| | | | |
|---|---|---|---|
| 6,570,889 B1 * | 5/2003 | Stirling-Gallacher et al. | 370/479 |
| 2005/0135609 A1 | 6/2005 | Lee et al. | |
| 2005/0166219 A1 * | 7/2005 | Chen et al. | 725/31 |
| 2007/0010250 A1 * | 1/2007 | Bosch et al. | 455/436 |
| 2008/0040604 A1 * | 2/2008 | Kim et al. | 713/168 |
| 2008/0198763 A1 * | 8/2008 | Fischer et al. | 370/254 |

FOREIGN PATENT DOCUMENTS

WO    01/76166 A2    10/2001

OTHER PUBLICATIONS

International Search Report: mailed Apr. 3, 2008; PCT/CN2007/071307.

* cited by examiner

*Primary Examiner* — Matthew Smithers
(74) *Attorney, Agent, or Firm* — Ladas & Parry LLP

(57) ABSTRACT

Embodiments of the present invention provide a data transmission method, a Coaxial-Cable Network Unit (CNU) and a Coaxial-cable Line Terminal (CLT). The method is applied to a point-to-multipoint Coaxial-cable Network, wherein the point-to-multipoint Coaxial-cable Network includes a Coaxial-cable Line Terminal, CLT, and a plurality of Coaxial-Cable Network Units, CNUs; the CLT shares transmission medium with the CNUs. The method includes: obtaining, by the CLT, an uplink receiving scrambling code, and decrypting, by the CLT, with the obtained uplink receiving scrambling code, data sent from a CNU after being encrypted with an uplink transmission scrambling code; and obtaining, by the CNU, a downlink receiving scrambling code, and decrypting, by the CNU, data received by the CNU with the obtained downlink receiving scrambling code; wherein the uplink receiving scrambling code is different from the downlink receiving scrambling code. In embodiments of the present invention, the CNU includes a scrambling code obtaining unit, a decryption execution unit and a data interaction unit. The CLT includes a scrambling code processing unit, a decryption execution unit and a data interaction unit. With the embodiments of the present invention, the security of the uplink data transmission in an Ethernet Passive Coaxial Network (EPCN) system is guaranteed, and the QoS of services is greatly enhanced.

16 Claims, 3 Drawing Sheets

DATA TRANSMISSION METHOD AND TERMINAL

FIELD OF THE INVENTION

The present invention relates to Ethernet communication technologies, and more particularly, to a data transmission method and terminal.

BACKGROUND OF THE INVENTION

Ethernet Passive Coaxial-cable Network (EPCN) technologies take the Ethernet as a carrier, adopt point-to-multipoint structure and a passive Coaxial-cable transmission mode, and transmit data streaming with a burst Ethernet packet mode in an uplink direction.

FIG. 1 is a schematic diagram illustrating structure of an EPCN system. With reference to FIG. 1, the EPCN system mainly includes a Coaxial-cable Line Terminal (CLT), a brancher/distributor, as well as multiple Coaxial-Cable Network Units (CNUs). The EPCN system connects with various Ethernet devices via the CLT, and connects with user equipment via the CNUs. The EPCN system may be applied to various environments. At present, the most common application of the EPCN system is the Ethernet Broadband connecting to households in a building.

In the EPCN system, the basic process of data transmission is as follows. In the downlink, the CLT transmits data to the brancher/distributor connecting with different users, and the brancher/distributor connecting with different users forwards the data to the CNU of each user. In the uplink, each CNU transmits data to the brancher/distributor connecting with different users according to a certain transmission level, and the brancher/distributor forwards the data to the CLT.

Seen from the data transmission process in the EPCN system, in the uplink, data from any CNU must be transmitted, through the brancher/distributor, to the CLT. Therefore, the brancher/distributor connecting with different users possesses fixed isolation degree, so as to avoid that uplink data which is sent from one CNU to the CLT gets to another CNU through the brancher/distributor. The isolation degree is larger than transmission path loss generated by transmitting the uplink data between the CLT and the brancher/distributor, e.g. 25 dB in general. The brancher/distributor connecting with different users may isolate the uplink data as long as transmission level amplitude for transmitting uplink data by the CNU is less than the isolation degree of the brancher/distributor. That is, the brancher/distributor merely transmits the uplink data to the CLT instead of transmitting the uplink data to CNUs of other users.

However, in practical service applications, the transmission level amplitude adopted by all the CNUs for transmitting uplink data is generally uniform. The uniform transmission level amplitude is determined according to the largest transmission level amplitude required by each CNU. The largest transmission level amplitude is generally larger than the isolation degree of the brancher/distributor connecting with different users, and thus the brancher/distributor connecting with different users cannot isolate the uplink data transmitted by the CNUs, resulting in that the uplink data sent from a CNU of one user is filched by CNUs of other users. Thus, the security of transmitting the uplink data is greatly reduced and the Quality of Service of services is reduced.

SUMMARY

An embodiment of the present invention provides a data transmission method. Another embodiment of the present invention provides a CNU. Another embodiment of the present invention provides a CLT, by which the security of the uplink data transmission in the EPCN system is guaranteed.

The technical solution of the present invention is implemented as follows.

A data transmission method applied to a point-to-multipoint Coaxial-cable Network, wherein the point-to-multipoint Coaxial-cable Network includes a Coaxial-cable Line Terminal, CLT, and a plurality of Coaxial-Cable Network Units, CNUs; the CLT shares transmission medium with the CNUs, the method includes: obtaining, by the CLT, an uplink receiving scrambling code, and decrypting, by the CLT, with the obtained uplink receiving scrambling code, data sent from a CNU after being encrypted with an uplink transmission scrambling code; and obtaining, by the CNU, a downlink receiving scrambling code, and decrypting, by the CNU, data received by the CNU with the obtained downlink receiving scrambling code; wherein the uplink receiving scrambling code is different from the downlink receiving scrambling code. A CNU includes a scrambling code obtaining unit, configured to obtain a downlink receiving scrambling code different from an uplink receiving scrambling code, and send the obtained downlink receiving scrambling code to a decryption execution unit;

a data interaction unit, configured to send received data to the decryption execution unit; and the decryption execution unit, configured to decrypt the data received from the data interaction unit according to the received downlink receiving scrambling code.

An access device is applied to a data network which includes at least two access devices and at least one convergence device. A signal for carrying data sent by the access device is able to get to the convergence device and at least one of other access devices, and the access device includes:

an uplink transmission unit, configured to encrypt uplink data with an encryption mode and send the encrypted uplink data, wherein the encryption mode is compatible with a decryption mode adopted by the convergence device when receiving data, and is not compatible with a decryption mode adopted by at least one of other access devices when receiving data.

A convergence device is applied to a data network which comprises a first access device, a second device and at least one convergence device. A signal for carrying data sent by the first access device is able to get to the convergence device and the second access device, and the convergence device includes:

an uplink receiving unit, configured to receive and decrypt encrypted uplink data sent from the first or second access device; and a downlink transmission unit, configured to send downlink data to the first access device, and encrypt the downlink data with an encryption mode different from that adopted by the second access device when sending uplink data.

A receiving and transmitting device is applied to an access network device in a network sharing transmission medium, and is configured to establish an uplink channel and a downlink channel with a receiving and transmitting device of other network devices. An encryption mode of the uplink channel is different from that of the downlink channel.

It can be seen that, the uplink data must be decrypted with the uplink receiving scrambling code in accordance with embodiments of the present invention. Meanwhile, the downlink data must be decrypted with the downlink receiving scrambling code. Since the set uplink and downlink receiving scrambling codes are different from each other in accordance with embodiments of the present invention, and a CNU of one user may only obtain the downlink receiving scrambling code, even if the CNU has received uplink data transmitted by CNUs of other users, the CNU may only decrypt the uplink data with the downlink receiving scrambling code. Subsequently, contents of the uplink data cannot be corrected decrypted, and it is avoided that the uplink data transmitted by a CNU of one user is filched by CNUs of other users. Thus, the security of the uplink data transmission in the EPCN system is guaranteed, and the QoS of services is greatly enhanced.

DETAILED DESCRIPTION OF THE INVENTION

To make objectives, technical solution and advantages of the present invention clearer, the present invention is further described in detail with reference to accompanying drawings and embodiments.

It can be obtained by analyzing a transmission process of uplink data in the EPCN system that other CNUs may receive the uplink data as long as transmission level amplitude adopted by one CNU for transmitting the uplink data is larger than isolation degree of a brancher. In this way, in order to avoid filching of information about the uplink data among CNUs and guarantee the security of the uplink data, one feasible mode is that the a CNU can receive the uplink data sent from other CNUs, but the CNU can not correctly decrypt and obtain the uplink data.

Therefore, an embodiment of the present invention provides a data transmission method in an EPCN system. In accordance with the method, an uplink receiving scrambling code and an uplink transmission scrambling code are saved, and a downlink receiving scrambling code and a downlink transmission scrambling code are saved. Wherein, the uplink receiving scrambling code is different from the downlink receiving scrambling code. The CLT obtains the uplink receiving scrambling code, and decrypts data sent from the CNU and encrypted with the uplink transmission scrambling code, with the obtained uplink receiving scrambling code. The CNU obtains the downlink receiving scrambling code, and decrypts the received data with the obtained downlink receiving scrambling code.

Figure 2:
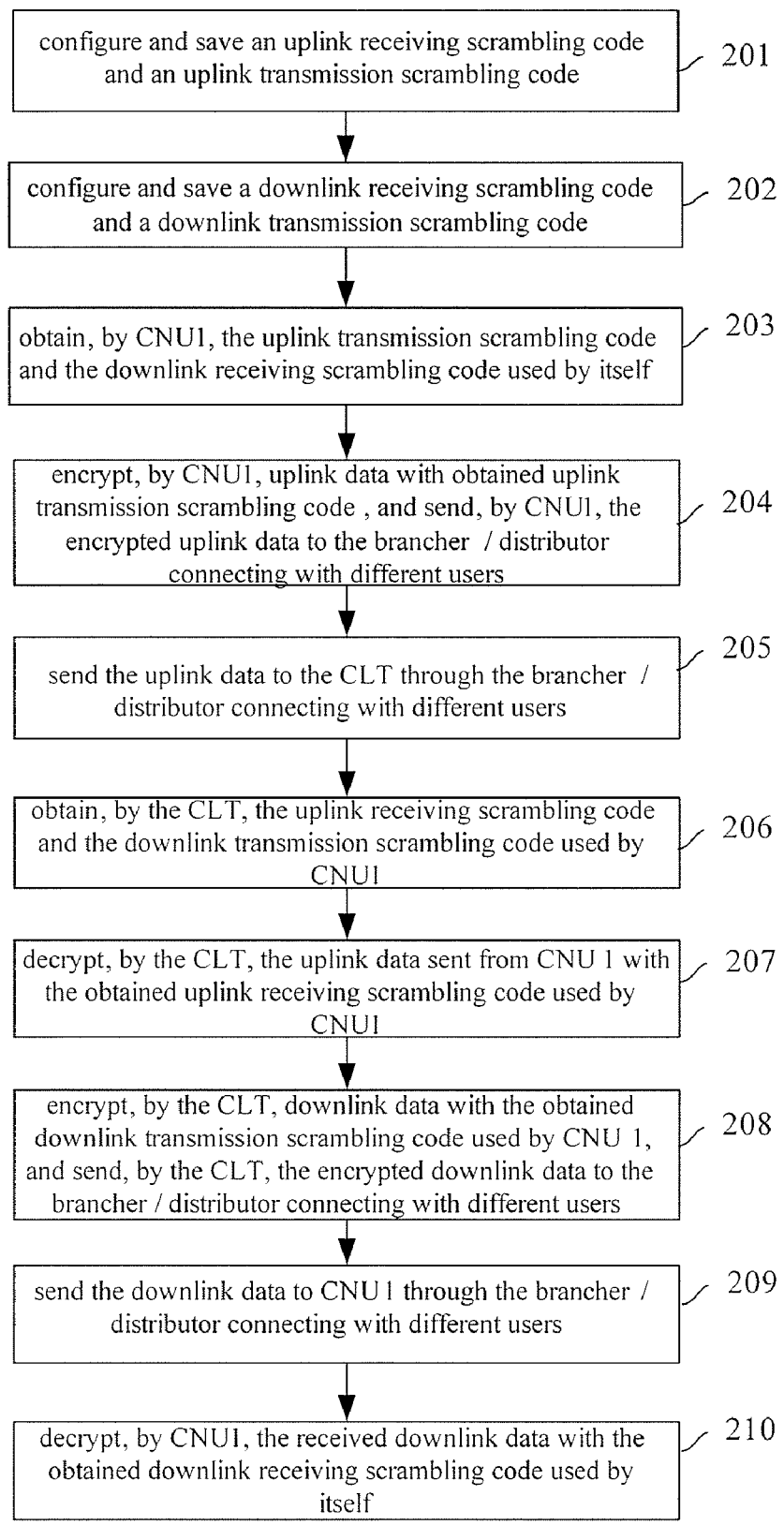
FIG. 2 is a flow chart illustrating data transmission in an EPCN system in accordance with an embodiment of the present invention.

FIG. 2 is a flow chart illustrating data transmission in an EPCN system in accordance with an embodiment of the present invention. With reference to FIG. 2, in this embodiment of the present invention, the data transmission process in the EPCN system includes the following blocks.

Block 201: An uplink receiving scrambling code and an uplink transmission scrambling code are configured and saved.

Here, the uplink receiving scrambling code and the uplink transmission scrambling code are configured for performing encryption and decryption processes on uplink data in subsequent processes.

Block 202: A downlink receiving scrambling code and a downlink transmission scrambling code are configured and saved.

Here, the downlink receiving scrambling code and the downlink transmission scrambling code are configured for performing the encryption and decryption processes on downlink data in subsequent processes.

It should be noted that the uplink receiving scrambling code and the downlink receiving scrambling code configured in Blocks 201 and 202 are different.

In the Block 201, the process for configuring the uplink receiving scrambling code and the uplink transmission scrambling code may be implemented in the following two modes.

Mode one: An uplink receiving scrambling code corresponding to each CNU is configured for a CLT, and an uplink transmission scrambling code is configured for each CNU.

In Mode one, the security of uplink data transmission may be further guaranteed by making any two uplink receiving scrambling codes different and making any two uplink transmission scrambling codes different.

Mode two: An uplink receiving scrambling code corresponding to all the CNUs is configured for the CLT, and a same uplink transmission scrambling code is configured for all the CNUs.

In the Block 202, the process for configuring the downlink receiving scrambling code and the downlink transmission scrambling code may also be implemented in the following two ways.

Mode A: A downlink receiving scrambling code is respectively configured for each CNU, and a downlink transmission scrambling code respectively corresponding to each CNU is configured for the CLT.

In Mode A, the security of downlink data transmission may be further guaranteed by making any two downlink receiving scrambling codes different, and making any two downlink transmission scrambling codes different.

Mode B: A downlink transmission scrambling code corresponding to all the CNUs is configured for the CLT, and a same downlink receiving scrambling code is configured for all the CNUs.

Since it is the CNUs that are configured to use the uplink transmission and downlink receiving scrambling codes, the uplink transmission and downlink receiving scrambling codes may be directly configured in each CNU in Blocks 201 and 202. Thus, the uplink transmission and downlink receiving scrambling codes are saved in the CNU. Because it is the CLT that is configured to use the downlink transmission and uplink receiving scrambling codes, the downlink transmission and uplink receiving scrambling codes which can be used by each CNU may be directly configured in the CLT. Thus, the downlink transmission and uplink receiving scrambling codes are saved in each CLT.

In addition, in embodiments of the present invention, third-party equipment except for the CLT and the CNUs may be configured in the EPCN system. And, all the scrambling codes needed by the CLT and the CNUs may be configured and saved in the third-party equipment in the Blocks 201 and 202. In this way, it is more convenient for the implementation of services and centralized maintenance and management of the subsequent services, e.g. it is convenient for performing a large amount of operations such as modifying the uplink receiving scrambling codes of the CNUs.

Block 203: One CNU, such as CNU1, obtains the uplink transmission and downlink receiving scrambling codes used by itself.

Here, in Blocks 201 and 202, the uplink transmission and downlink receiving scrambling codes used by each CNU are directly configured on each CNU. And then, in this Block, CNU1 obtains the uplink transmission and downlink receiving scrambling codes used by itself according to the configuration of CNU1.

In Blocks 201 and 202, all the scrambling codes are directly configured in the third-party equipment. Then, in this Block, CNU1 may obtain the uplink transmission and downlink receiving scrambling codes used by CNU1 from the third-party equipment. The process for obtaining the uplink transmission and downlink receiving scrambling codes is as follows.

After configuring the scrambling codes in the third-party equipment, the third-party equipment initiatively sends the uplink transmission and downlink receiving scrambling codes used by each CNU to each CNU. For example, the third-party equipment sends the uplink transmission and downlink receiving scrambling codes used by CNU1 to CNU1, and sends the uplink transmission and downlink receiving scrambling codes used by CNU2 to CNU2, etc. CNU1 obtains the uplink transmission and downlink receiving scrambling codes used by itself through receiving.

Alternatively, CNU1 firstly sends a request message to the third-party equipment. After receiving the request message from the CNU1, the third-party equipment sends the uplink transmission and downlink receiving scrambling codes used by CNU1 to CNU1. CNU1 obtains the uplink transmission and downlink receiving scrambling codes used by itself through receiving.

The CNU and the third-party equipment may execute the above interaction processes with a message newly defined in embodiments of the present invention.

Block 204: CNU1 encrypts uplink data needed to be sent to the CLT with the obtained uplink transmission scrambling code, and sends the encrypted uplink data to the brancher/distributor connecting with different users.

Block 205: The uplink data is sent to the CLT through the brancher/distributor connecting with different users.

Block 206: The CLT obtains the uplink receiving and downlink transmission scrambling codes used by CNU1.

In Blocks 201 and 202, the uplink receiving and downlink transmission scrambling codes are directly configured in the CLT. In this Block, the CLT may obtain the uplink receiving and downlink transmission scrambling codes used by CNU1 according to the configuration of the CLT.

In Blocks 201 and 202, all the scrambling codes are directly configured in the third-party equipment. In the Block, the CLT obtains the uplink receiving and downlink transmission scrambling codes used by CNU1 from the third-party equipment. The process for obtaining the scrambling codes is as follows.

After configuring the scrambling code in the third-party equipment, the third-party equipment may initiatively send the configured uplink receiving and downlink transmission scrambling codes used by each CNU to the CLT. The CLT obtains the uplink receiving and downlink transmission scrambling codes used by CNU1 through receiving.

Alternatively, the CLT may firstly send a request message to the third-party equipment. After receiving the request message from the CLT, the third-party equipment sends the uplink receiving and downlink transmission scrambling codes used by each CNU to the CLT. The CLT obtains the uplink receiving and downlink transmission scrambling codes used by CNU1 through receiving.

The CLT and the third-party equipment may execute the interaction processes with the message newly defined in embodiments of the present invention.

It should be noted that, in the above Block 204, if the transmission level amplitude of the uplink data sent from CNU1 is larger than the isolation degree of the brancher/distributor when the uplink data arrives at the brancher/distributor connecting with different users, the uplink data not only will be sent to the CLT through the brancher/distributor connecting with different users, but also will be sent to other CNUs, e.g. CNU2 via the brancher/distributor connecting with different users in Block 205. At this time, although CNU2 receives the uplink data from CNU1, it should be noted that, the uplink data may only be decrypted with the uplink receiving scrambling code since the uplink data was encrypted with the uplink transmission scrambling code. Thus, CNU2 can not correctly decrypt contents of the uplink data with the downlink receiving scrambling code which is different from the uplink receiving scrambling code. And subsequently, the security of the uplink data transmission is improved.

Block 207: The CLT decrypts the uplink data received from CNU1 with the obtained uplink receiving scrambling code used by CNU1.

Block 208: When it is necessary to send downlink data to CNU1, the CLT encrypts the downlink data with the obtained downlink transmission scrambling code used by CNU1, and sends the encrypted downlink data to the brancher/distributor connecting with different users.

Block 209: The downlink data is sent to CNU1 through the brancher/distributor connecting with different users.

Block 210: CNU1 decrypts the received downlink data with the obtained downlink receiving scrambling code used by itself.

Figure 3:
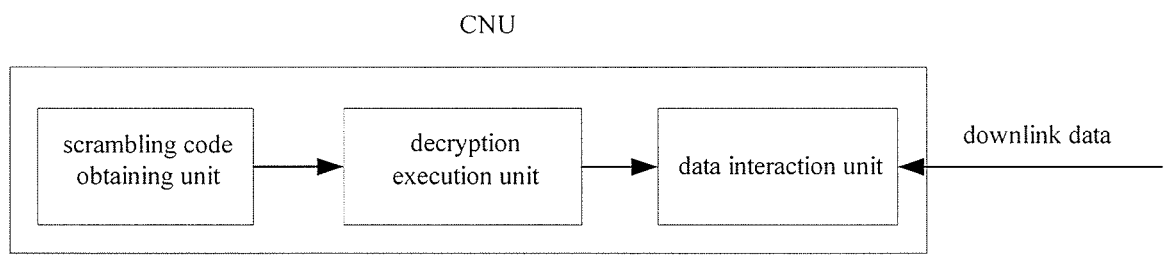
FIG. 3 is a schematic diagram illustrating interior architecture of a CNU in accordance with an embodiment of the present invention.

Correspondingly, an embodiment of the present invention also provides a CNU. FIG. 3 is a schematic diagram illustrating interior architecture of a CNU in accordance with an embodiment of the present invention. With reference to FIG. 3, in this embodiment of the present invention, interior architecture of the CNU may include a scrambling code obtaining unit, a decryption execution unit and a data interaction unit.

The scrambling code obtaining unit is configured to receive a downlink receiving scrambling code different from an uplink receiving scrambling code, and send the obtained downlink receiving scrambling code to the decryption execution unit.

The data interaction unit is configured to send data received from outside to the decryption execution unit.

The decryption execution unit is configured to decrypt the data sent from the data interaction unit with the received downlink receiving scrambling code.

With reference to FIG. 3, in the CNU provided by embodiments of the present invention, the process for obtaining the downlink receiving scrambling code by the scrambling code obtaining unit may include: The scrambling code obtaining unit obtains the downlink receiving scrambling code according to configuration information input by a manager. Alternatively, the scrambling code obtaining unit may receive the downlink receiving scrambling code sent by the third-party equipment directly or after sending a request message to third-party equipment.

Figure 4:
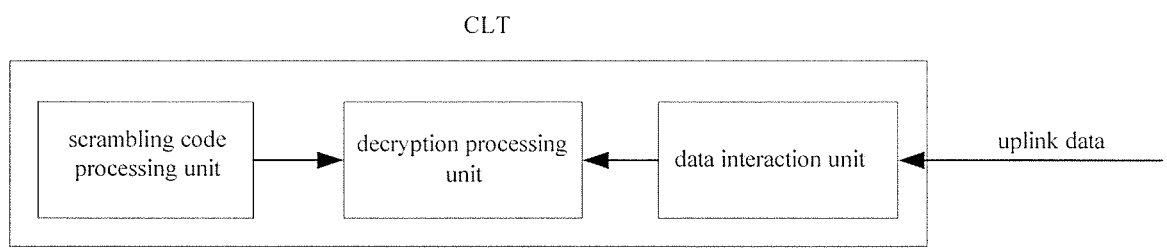
FIG. 4 is a schematic diagram illustrating interior architecture of a CLT in accordance with an embodiment of the present invention.

Correspondingly, an embodiment of the present invention also provides a CLT. FIG. 4 is a schematic diagram illustrating interior architecture of a CLT in accordance with an embodiment of the present invention. With reference to FIG. 4, in this embodiment of the present invention, the interior architecture of the CLT may include a scrambling code processing unit, a decryption processing unit and a data interaction unit.

The scrambling code processing code is configured to obtain an uplink receiving scrambling code different from a downlink receiving scrambling code, and send the obtained uplink receiving scrambling code to the decryption processing unit.

The data interaction unit is configured to send data received from outside to the decryption processing unit.

The decryption processing unit is configured to decrypt the data sent by the data interaction unit with the uplink receiving scrambling code sent by the scrambling code processing unit.

Figure 1:
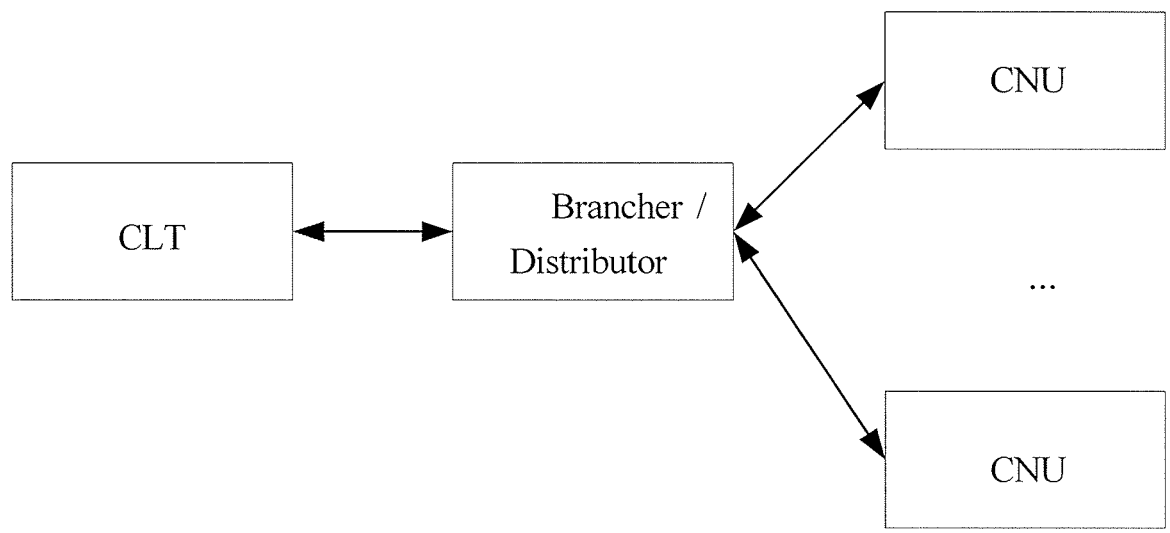
FIG. 1 is a schematic diagram illustrating structure of an EPCN system.

Correspondingly, an embodiment of the present invention also provides an EPCN system. With reference to FIG. 1, the structure of the EPCN system in this embodiment of the present invention is identical to that disclosed in the conventional method illustrated in FIG. 1. That is, the EPCN system includes a CLT, a brancher/distributor and multiple CNUs. However, in accordance with embodiments of the present invention, functions of the CLT and CNUs are different from those disclosed in the conventional method.

The CLT is configured to obtain a downlink transmission scrambling code and an uplink receiving scrambling code which is different from a downlink receiving scrambling code, decrypt received uplink data with obtained uplink receiving scrambling code, encrypt downlink data with obtained downlink transmission scrambling code, and send the encrypted downlink data to each CNU through the brancher/distributor.

Each CNU is configured to obtain an uplink transmission scrambling code and a downlink receiving scrambling code which is different from an uplink receiving scrambling code, decrypt the received downlink data with the obtained downlink receiving scrambling code, encrypt uplink data with the obtained uplink transmission scrambling code, and send the encrypted uplink data to the CLT through the brancher/distributor.

Preferably, the EPCN system provided by the embodiment of the present invention may further include third-party equipment. The third-party equipment may be configured to save the uplink transmission and receiving scrambling codes, and the downlink transmission scrambling code, and the downlink receiving scrambling code which is different from the uplink receiving scrambling code, send the saved downlink transmission scrambling code and uplink receiving scrambling code to the CLT, such that the CLT may obtain the downlink transmission scrambling code and the uplink receiving scrambling code which is different from the downlink receiving scrambling code. The third-party equipment may send the uplink transmission scrambling code and the downlink receiving scrambling code to each CNU, so that each CNU may obtain the uplink transmission scrambling code, and the downlink receiving scrambling code which is different from the uplink receiving scrambling code.

In the embodiment of the present invention, the third-party equipment may be a dedicated device newly added in the embodiment, or may be an existed device in the Ethernet network.

In accordance with the above embodiments of the present invention, an access device may be obtained. The access device may be applied to a data network, which includes at least two access devices and at least one convergence device. A signal for carrying data sent by the access device may be sent to the convergence device and at least one of other access devices. In particular, the access device includes the following units.

An uplink transmission unit is configured to encrypt uplink data with an encryption mode and send the encrypted uplink data. Wherein, the encryption mode is compatible with a decryption mode used by the convergence device when receiving data, but is not compatible with a decryption mode adopted by at least one of other access devices when receiving data.

The above access device may also include a downlink receiving unit, configured to decrypt received data with a decryption mode. Wherein, the decryption mode is compatible the encryption mode adopted by the convergence device when sending data, but is not compatible with the encryption mode adopted by at least one of other access devices when sending data.

Preferably, in the descriptions above regarding the access device, the data network may be a data network sharing transmission medium.

Preferably, in the descriptions above regarding the access device, the encryption and decryption respectively refer to scrambling code encryption and scrambling code decryption.

In accordance with the above embodiments of the present invention, a convergence device may be obtained. The convergence device is applied to a data network, which includes a first access device, a second access device and at least one convergence device. A signal for carrying data sent by the first access device may be sent to the convergence device and the second access device. In particularly, the convergence device includes the following units.

An uplink receiving unit is configured to receive and decrypt encrypted uplink data sent from the first or second access device.

A downlink transmission unit is configured to send downlink data to the first access device, and encrypt the downlink data to be sent with an encryption mode different from that adopted by the second access device when sending uplink data.

In the descriptions above regarding the convergence device, the data network is a data network sharing transmission medium.

In the above convergence device, the uplink receiving unit decrypts uplink data sent by all the access devices with a same decryption mode.

In the above convergence device, the downlink transmission unit encrypts downlink data to be sent to all the access devices with a same encryption mode.

Preferably, in the descriptions regarding the above convergence device, the encryption and decryption respectively refer to scrambling code encryption and scrambling code decryption.

In accordance with the embodiment of the present invention, one kind of receiving and transmitting device may be obtained. The receiving and transmitting device is applied to an access network device in a network sharing transmission medium, and is used for establishing uplink channels and downlink channels with receiving and transmitting devices of other network devices. In particular, the encryption mode of the uplink channel is different from that of the downlink channel.

In accordance with the embodiment of the present invention, one kind of first receiving and transmitting device may be obtained. The first receiving and transmitting device is applied to a first network device in a network sharing transmission medium. The network at least includes a second network device with a second receiving and transmitting device and a third network device with a third receiving and transmitting device. The first receiving and transmitting device establishes a first uplink channel and a first downlink channel with the second receiving and transmitting device. The third receiving and transmitting device establishes a second uplink channel and a second downlink channel with the second receiving and transmitting device. In particular, the encryption mode of the first uplink channel is different from that of the second downlink channel.

In accordance with the embodiments of the present invention, another kind of first receiving and transmitting device may be obtained. This kind of first receiving and transmitting device is applied to a first network device in a network sharing transmission medium. The network at least includes a second network device with a second receiving and transmitting device and a third network device with a third receiving and transmitting device. The first receiving and transmitting device establishes a first uplink channel and a first downlink channel with the second receiving and transmitting device. The third receiving and transmitting device establishes a second uplink channel and a second downlink channel with the second receiving and transmitting device. In particular, the encryption mode of the first uplink channel is different from that of the second downlink channel.

With the descriptions regarding to the embodiments, a person skilled in the art of the present invention is clear that embodiments of the present invention may be implemented with software and generalized common computer equipment capable of running the software (may be understood as a certain general hardware platform). Certainly, embodiments of the present invention may also be implemented with hardware design. But in many cases, the former is a better way. Based on such understanding, the substantial part of the technical scheme of the present invention or the part contributing to the conventional method is embodied with computer software products. The computer software products are stored in a storage medium. The computer software products include some instructions which are used for making the universal hardware platform execute the methods disclosed in the embodiments of the present invention.

In a word, the above descriptions are only preferred embodiments of this invention, and are not used for limiting the invention. Any modification, equivalent replacement or improvement made under the spirit and principles of this invention should be covered within the protection scope of this invention.

The invention claimed is:

1. A data transmission method applied to a point-to-multipoint Coaxial-cable Network, wherein the point-to-multipoint Coaxial-cable Network comprises a Coaxial-cable Line Terminal, CLT, and a plurality of Coaxial-Cable Network Units, CNUs; the CLT shares transmission medium with the CNUs, the method comprises:
   obtaining, by the CLT, an uplink receiving scrambling code used by a CNU, and decrypting, by the CLT, with the obtained uplink receiving scrambling code used by the CNU, data sent from the CNU after being encrypted with the uplink transmission scrambling code used by the CNU; and
   obtaining, by the CNU, a downlink receiving scrambling code used by the CNU, receiving data which is sent from the CLT and encrypted with a downlink transmission scrambling code used by the CNU and data which is sent from another CNU and encrypted with an uplink transmission scrambling code used by the another CNU and decrypting, by the CNU, data received by the CNU with the obtained downlink receiving scrambling code used by the CNU; wherein the uplink receiving scrambling code used by the another CNU is different from the downlink receiving scrambling code used by the CNU.

2. The method according to claim 1, further comprising:
   saving the uplink receiving scrambling code and the uplink transmission scrambling code corresponding to each CNU; wherein
   the uplink transmission scrambling code used by the CNU is the uplink transmission scrambling code corresponding to the CNU; and
   the uplink receiving scrambling code obtained by the CLT and used by the CNU is the uplink receiving scrambling code corresponding to the CNU;
   the uplink transmission scrambling code used by the CNU is different from the uplink transmission scrambling code used by the another CNU.

3. The method according to claim 1, further comprising:
   saving a same uplink receiving scrambling code and a same uplink transmission scrambling code for all CNUs; wherein
   the uplink transmission scrambling code used by the CNU is the uplink transmission scrambling code corresponding to all the CNUs; and
   the uplink receiving scrambling code obtained by the CLT and used by the CNU is the uplink receiving scrambling code corresponding to all the CNUs;
   the uplink transmission scrambling code used by the CNU is identical with the uplink transmission scrambling code used by the another CNU.

4. The method according to claim 1, further comprising:
   saving the downlink receiving scrambling code and a downlink transmission scrambling code corresponding to each CNU; wherein
   the downlink transmission scrambling code used by the CNU when sending downlink data to the CNU is the downlink transmission scrambling code corresponding to the CNU; and
   the downlink receiving scrambling code obtained and used by the CNU is the downlink receiving scrambling code corresponding to the CNU.

5. The method according to claim 1, further comprising:
   saving a same downlink receiving scrambling code and a same downlink transmission scrambling code for all CNUs;
   the downlink transmission scrambling code used by the CNU when sending downlink data to the CNU is the downlink transmission scrambling code corresponding to all the CNUs;
   the downlink receiving scrambling code obtained and used by the CNU is the downlink receiving scrambling code corresponding to all the CNUs.

6. The method according to claim 1, further comprising:
   saving the scrambling code in third-party equipment except for the CLT and the CNUs; and wherein
   obtaining the scrambling code comprises:
   obtaining the scrambling code from the third-party equipment.

7. A Coaxial-Cable Network Unit, CNU, comprising: a scrambling code obtaining unit, configured to obtain a downlink receiving scrambling code used by the CNU, and send the obtained downlink receiving scrambling code used by the CNU to a decryption execution unit;
   a data interaction unit, configured to send data which is sent from a CLT and encrypted with a downlink transmission scrambling code used by the CNU and data which is send from another CNU and encrypted with an uplink transmission scrambling code used by the another CNU to the decryption execution unit; and the decryption execution unit, configured to decrypt the data received from the data interaction unit according to the received downlink receiving scrambling code used by the CNU;

wherein an uplink receiving scrambling code used by the another CNU is different from the downlink receiving scrambling code used by the CNU.

8. The CNU according to claim 7, wherein the scrambling code obtaining unit is further configured to obtain the downlink receiving scrambling code used by the CNU according to configuration information input by a manager.

9. The CNU according to claim 7, wherein the scrambling code obtaining unit is configured to receive the downlink receiving scrambling code used by the CNU sent by third-party equipment directly or after sending a request message to the third-party equipment.

10. An access device applied to a data network which comprises at least two access devices and at least one convergence device, wherein a signal for carrying data sent by one access device is able to get to the convergence device and at least one of other access devices, the access device comprises:

an uplink transmission unit, configured to encrypt uplink data with an encryption mode used by the access device and send the encrypted uplink data, wherein the encryption mode used by the access device is compatible with a decryption mode adopted by the convergence device when receiving the uplink data, and is not compatible with a decryption mode adopted by another access device for decrypting data when receiving the data which is sent from the access device and encrypted with the encryption mode used by the access device.

11. The access device according to claim 10, further comprising:

a downlink receiving unit, configured to decrypt received data with a decryption mode used by the access device, wherein the decryption mode is compatible with an encryption mode adopted by the convergence device when sending the data, and the decryption mode is not compatible with an encryption mode adopted by the another access device for encrypting data when sending the data.

12. The access device according to claim 11, wherein the encryption and decryption are respectively scrambling code encryption and scrambling code decryption.

13. A convergence device applied to a data network which comprises a first access device, a second device and at least one convergence device, wherein a signal for carrying data sent by the first access device is able to get to the convergence device and the second access device, and the convergence device comprises:

an uplink receiving unit, configured to receive and decrypt encrypted uplink data sent from the first or second access device; and a downlink transmission unit, configured to send downlink data to the first access device, and encrypt the downlink data with an encryption mode different from that adopted by the second access device when sending uplink data.

14. The convergence device according to claim 13, wherein the uplink receiving unit is further configured to decrypt the uplink data sent by all the access devices with a same decryption mode.

15. The convergence device according to claim 14, wherein the downlink transmission unit is configured to encrypt the downlink data sent to all the access devices with a same encryption mode.

16. The convergence device according to claim 15, wherein the encryption and decryption are respectively scrambling code encryption and scrambling code decryption.

* * * * *